(12) United States Patent
Bozkurt et al.

(10) Patent No.: US 8,146,632 B2
(45) Date of Patent: Apr. 3, 2012

(54) TIGHTENING MECHANISM FOR ANTI-SKID AND TRACTION ENHANCEMENT DEVICES

(76) Inventors: Emrah Bozkurt, Istanbul (TR); Ender Bozkurt, Istanbul (TR); Murat Yerlikaya, Istanbul (TR)

( * ) Notice: Subject to any disclaimer, the term of this patent is extended or adjusted under 35 U.S.C. 154(b) by 642 days.

(21) Appl. No.: 12/094,117

(22) PCT Filed: Nov. 17, 2006

(86) PCT No.: PCT/EP2006/068631
§ 371 (c)(1),
(2), (4) Date: Sep. 11, 2008

(87) PCT Pub. No.: WO2007/057450
PCT Pub. Date: May 24, 2007

(65) Prior Publication Data
US 2009/0139621 A1    Jun. 4, 2009

(30) Foreign Application Priority Data
Nov. 18, 2005 (EP) ..................................... 05110988

(51) Int. Cl.
*B60C 27/10* (2006.01)
(52) U.S. Cl. ...................... 152/218; 152/217; 242/384.7; 242/385.4; 24/71 TT
(58) Field of Classification Search .................. 152/217, 152/218; 24/68 R, 70 TT, 69 TT, 71 TT, 24/68 TT; 242/384.7, 385.4, 388
See application file for complete search history.

(56) References Cited

U.S. PATENT DOCUMENTS

| | | | | |
|---|---|---|---|---|
| 2,434,119 A | * | 1/1948 | Nordmark | 242/382.6 |
| 2,701,693 A | * | 2/1955 | Nordmark et al. | 242/384.3 |
| 3,478,981 A | * | 11/1969 | Barecki et al. | 242/383.3 |
| 5,921,492 A | * | 7/1999 | Bauer | 242/317 |
| 6,619,353 B1 | * | 9/2003 | Kim | 152/225 R |
| 6,915,825 B1 | * | 7/2005 | Stevenson, Jr. | 152/218 |
| 7,503,517 B2 | * | 3/2009 | Ikuta et al. | 242/288 |
| 2003/0102065 A1 | | 6/2003 | Picher et al. | |
| 2006/0015988 A1 | * | 1/2006 | Philpott et al. | 2/410 |
| 2007/0199635 A1 | * | 8/2007 | McCauley et al. | 152/217 |

FOREIGN PATENT DOCUMENTS

| | | | |
|---|---|---|---|
| JP | 06-127224 A | | 5/1994 |
| JP | 06127224 A | * | 5/1994 |

* cited by examiner

*Primary Examiner* — Kip T Kotter
(74) *Attorney, Agent, or Firm* — Arent Fox LLP

(57) ABSTRACT

A tightening system (135) for use with anti-skid and traction devices for wheeled vehicles comprising a sealed tightening mechanism (130) which can clutch and ratchet the rotational movement applied by the user on a knob (212). The system further comprises at least one connection assembly (134) which is adapted to be pivotably and releasably attached to a proximal end of a surface contact member (63;71) and which is adapted to be connected to the tightening mechanism. The tightening mechanism comprises a locking component (193) which has a base plate (240), an inner sidewall (195) and an outer sidewall (194) standing perpendicular to said base plate (240). The inner sidewall recessed portion has a plurality of recess (230;231) which are adapted to engage with a peripheral projection of the upper clutch (206) for holding the knob in place during locked and unlocked positions of the knob. The outer sidewall enters fully or partly, respectively in locked and unlocked positions of the knob, into a corresponding slot (210) of said knob (212) for sealing inner volume of the tightening mechanism from outside conditions.

20 Claims, 14 Drawing Sheets

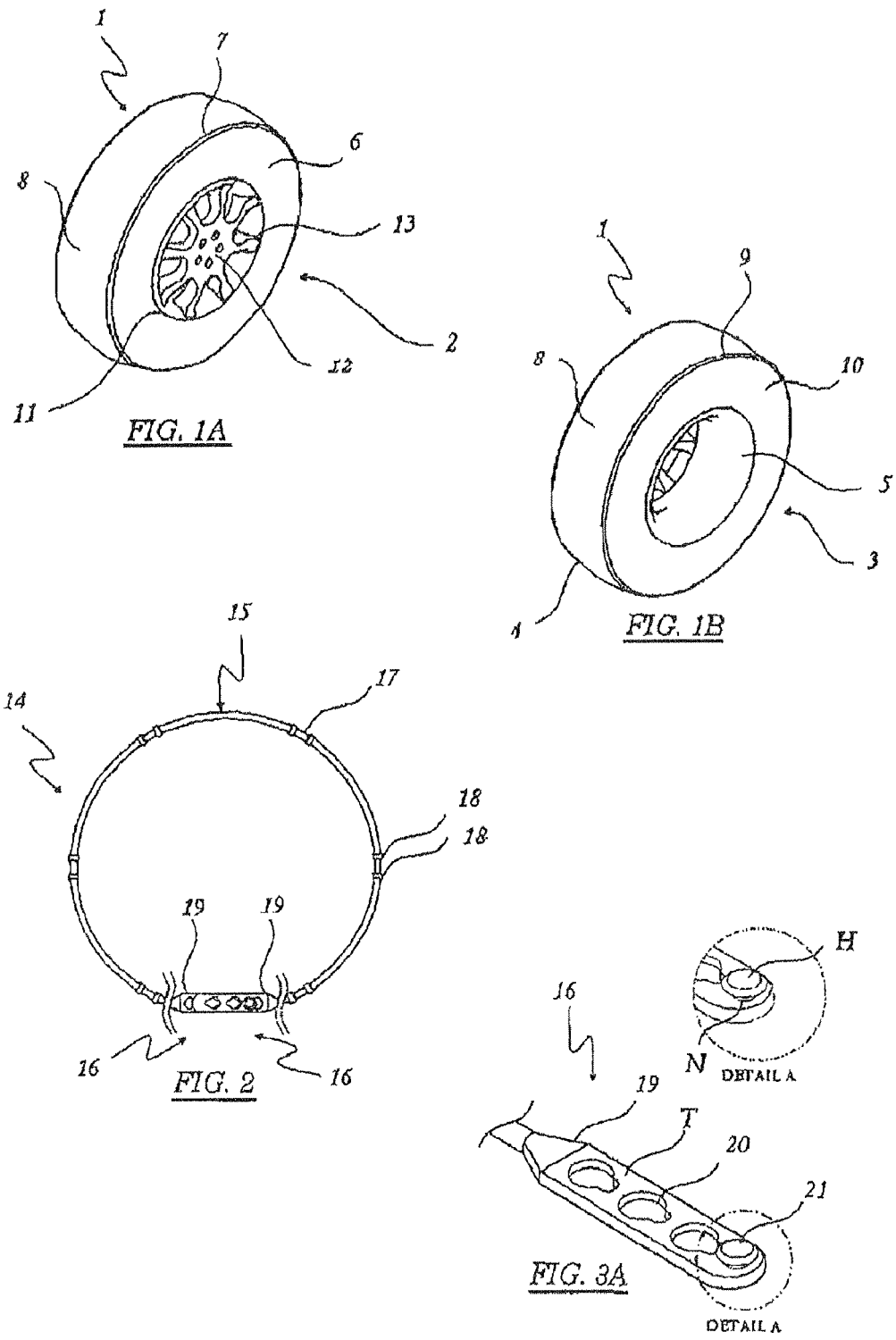

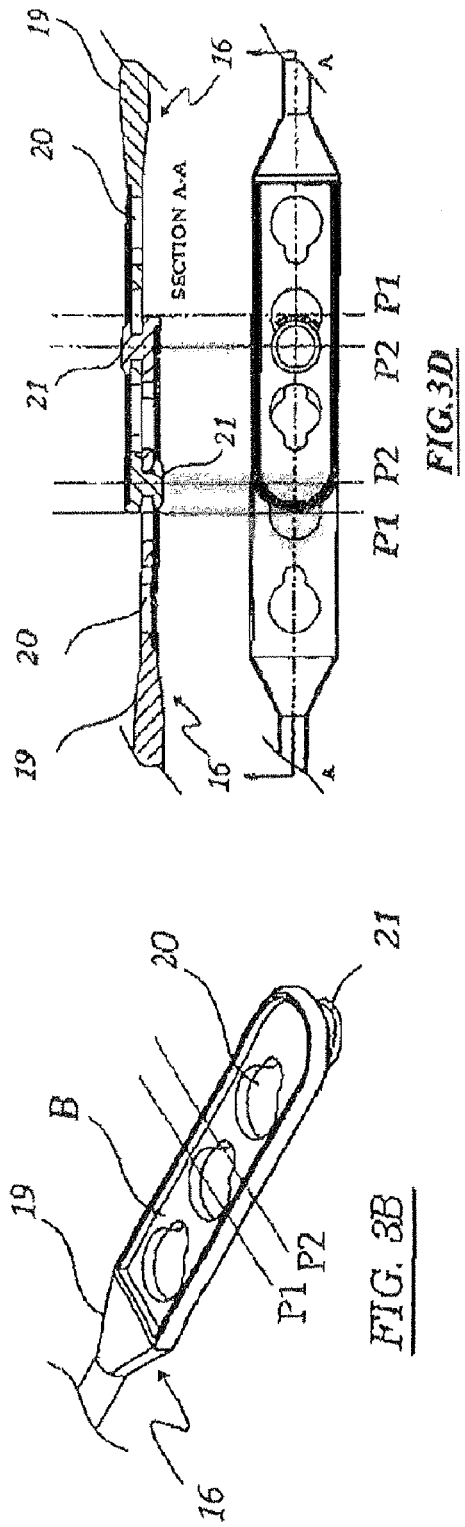
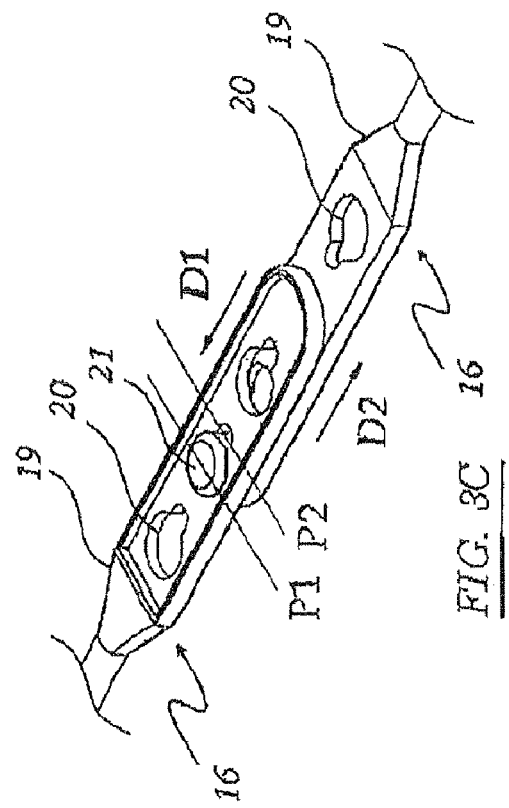
FIG. 3B
FIG. 3C
FIG. 3D

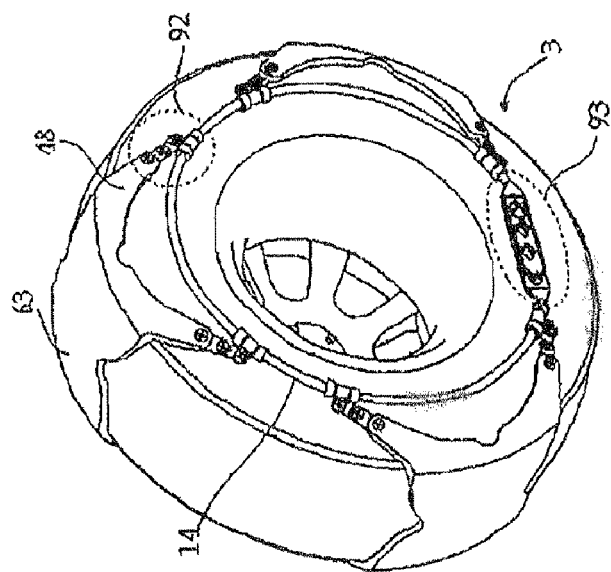
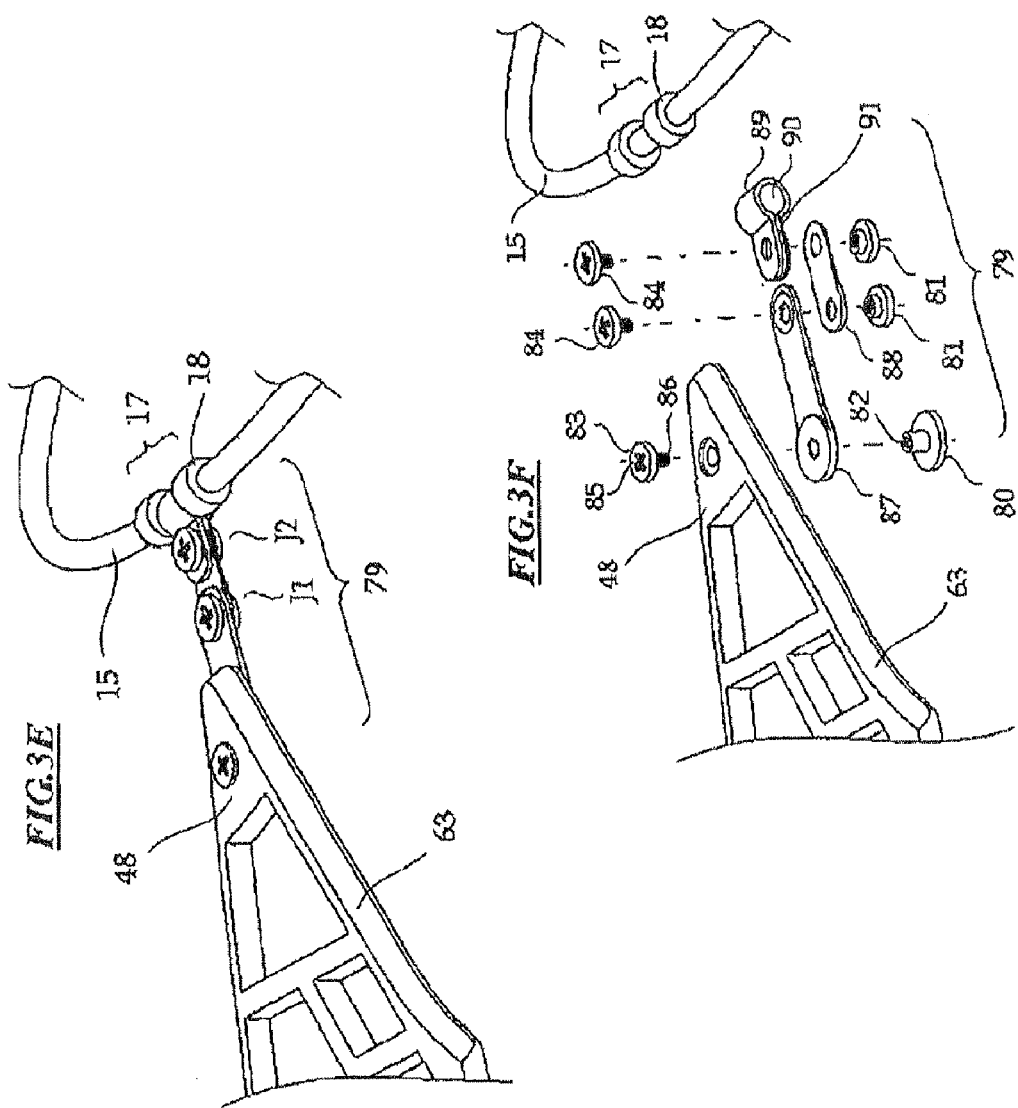

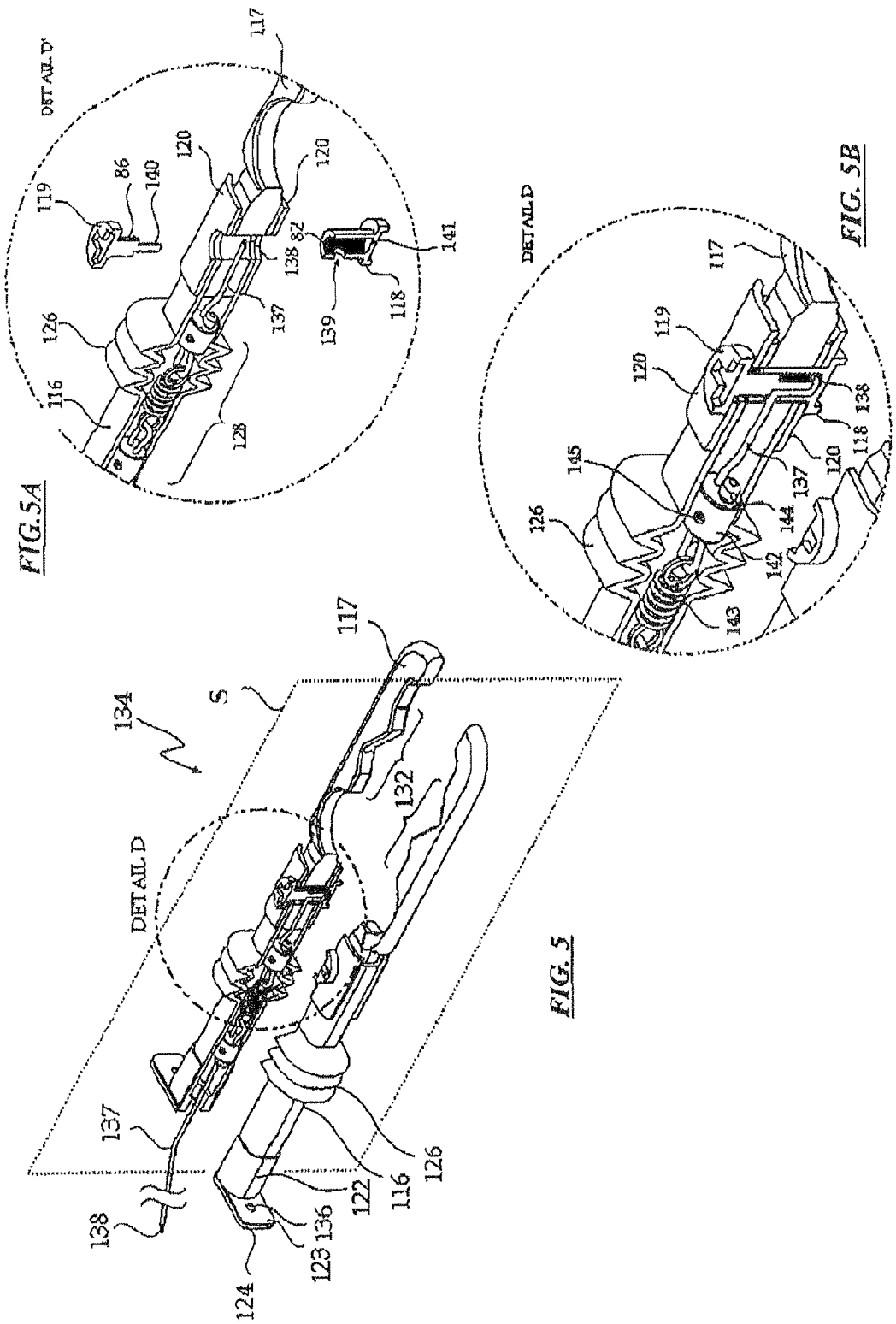

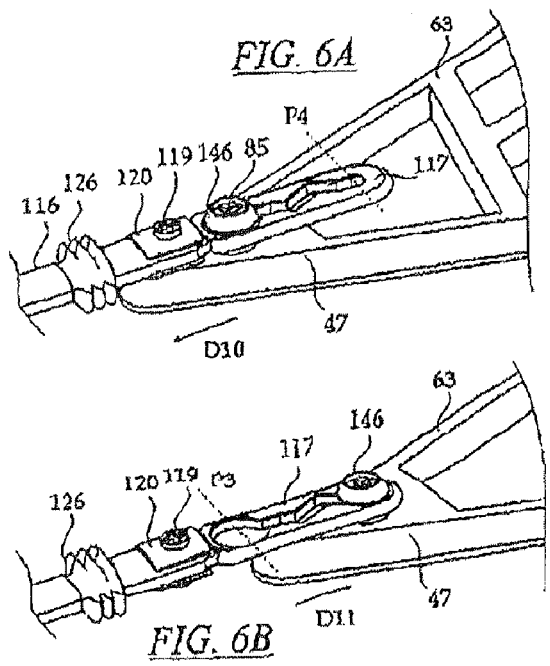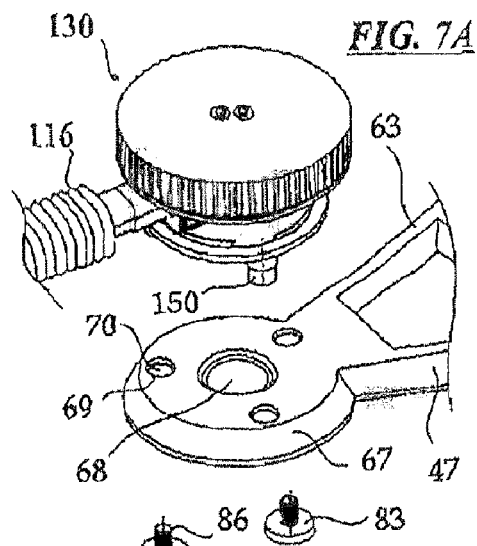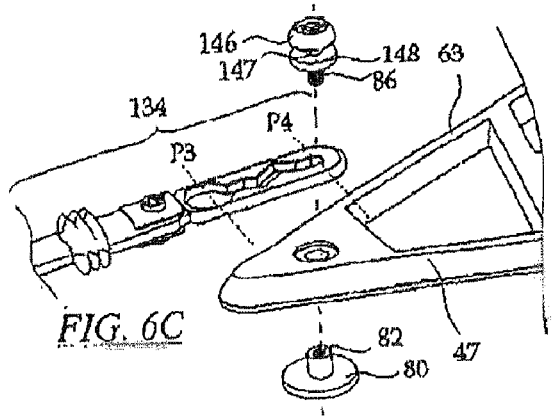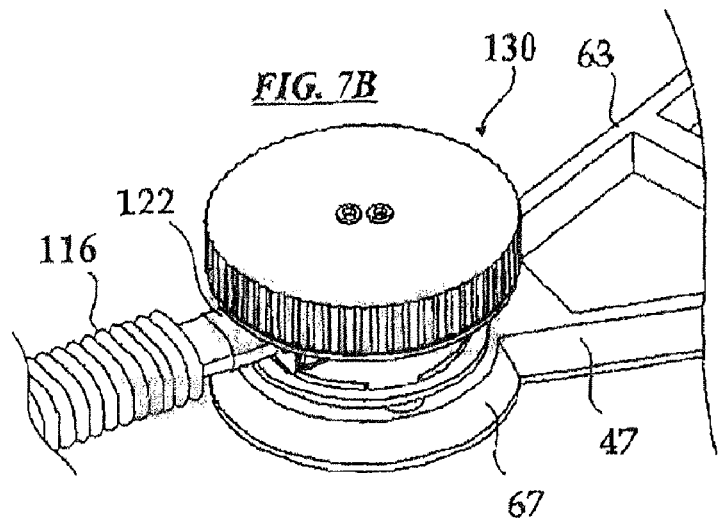

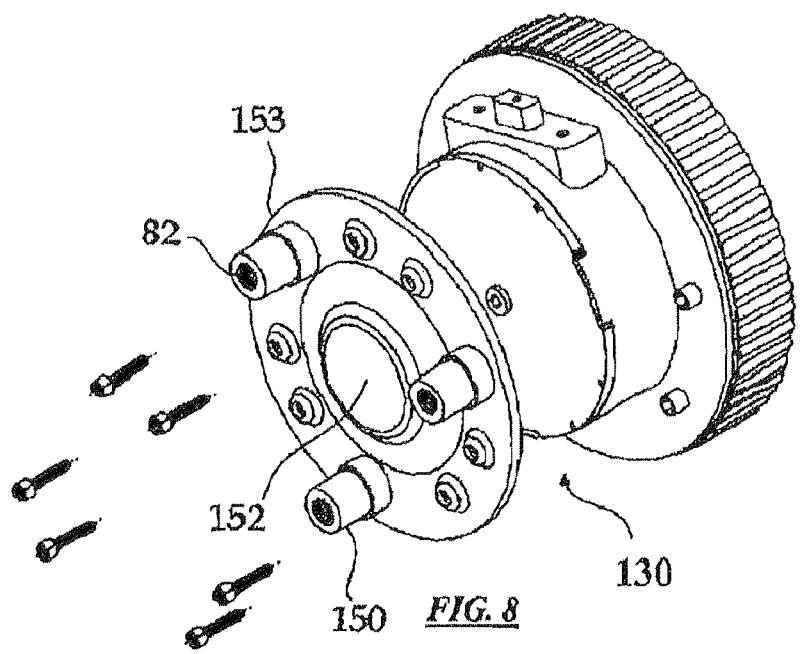
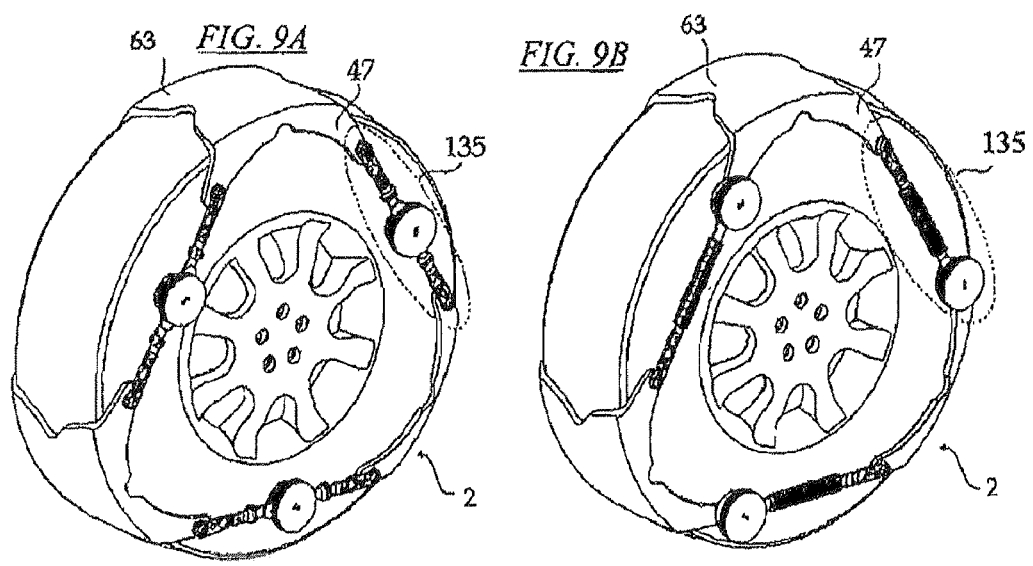

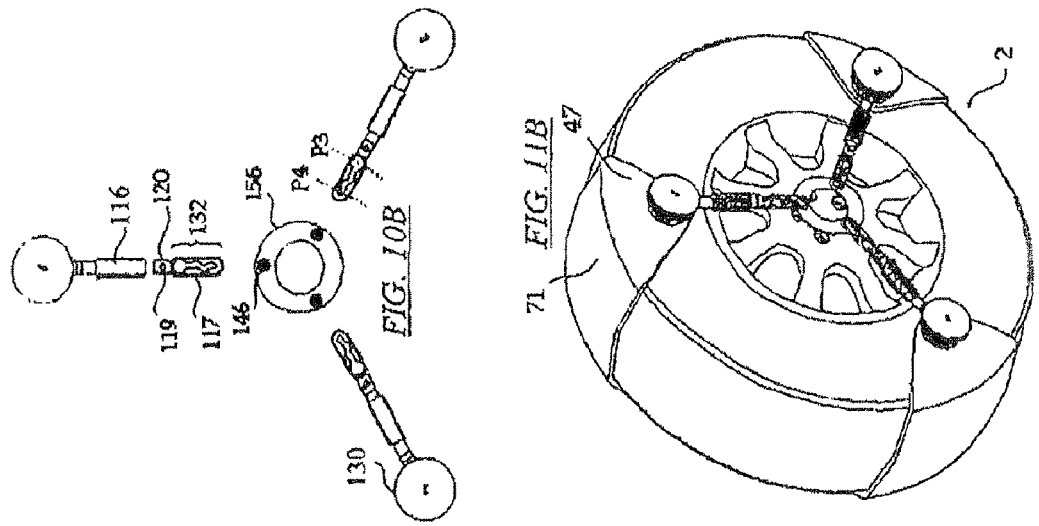
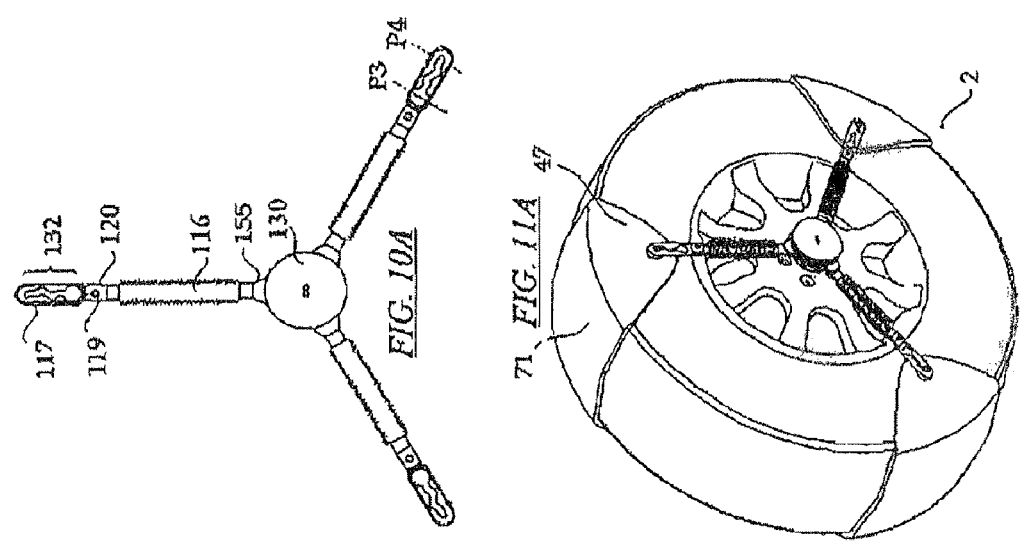

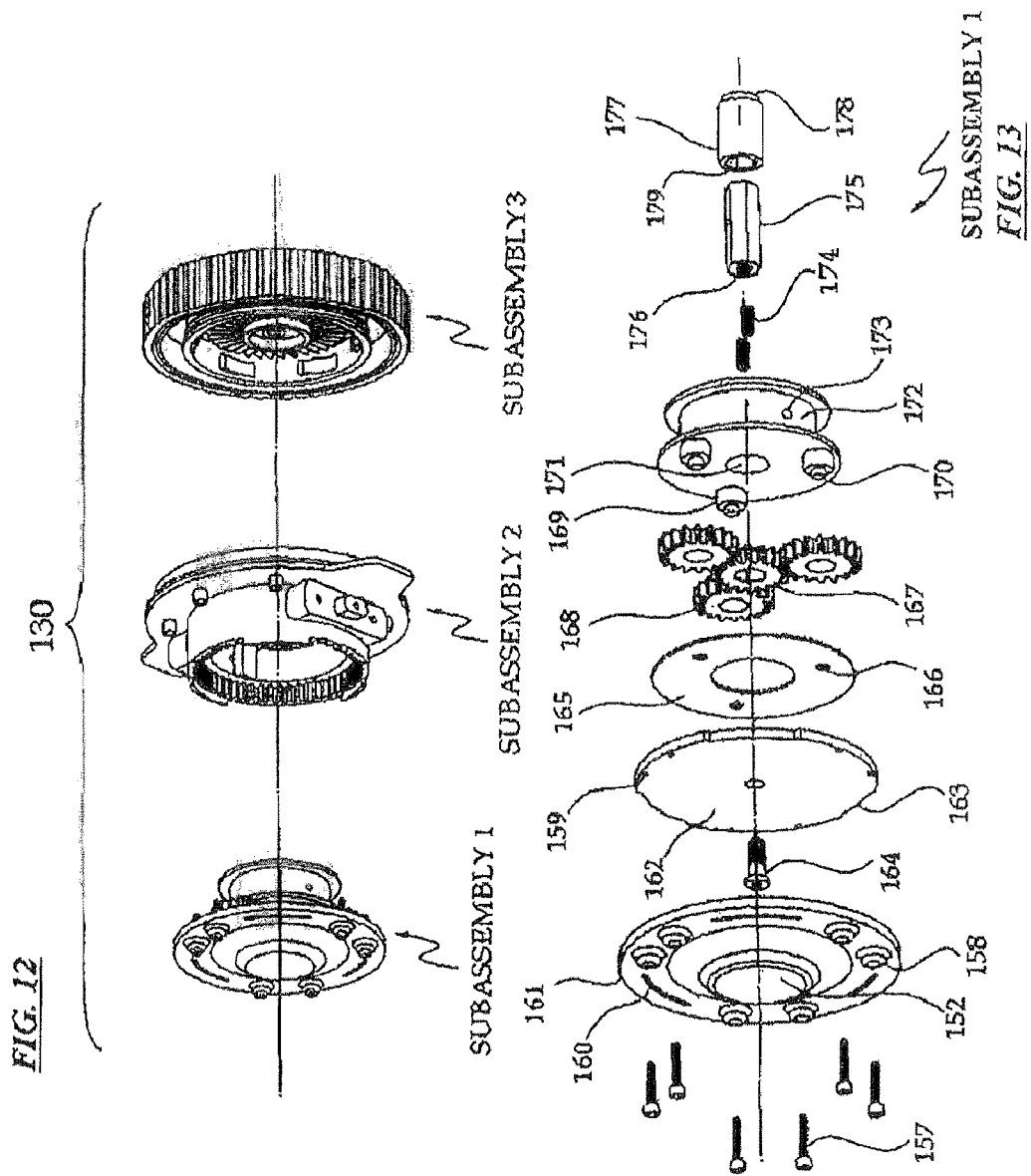

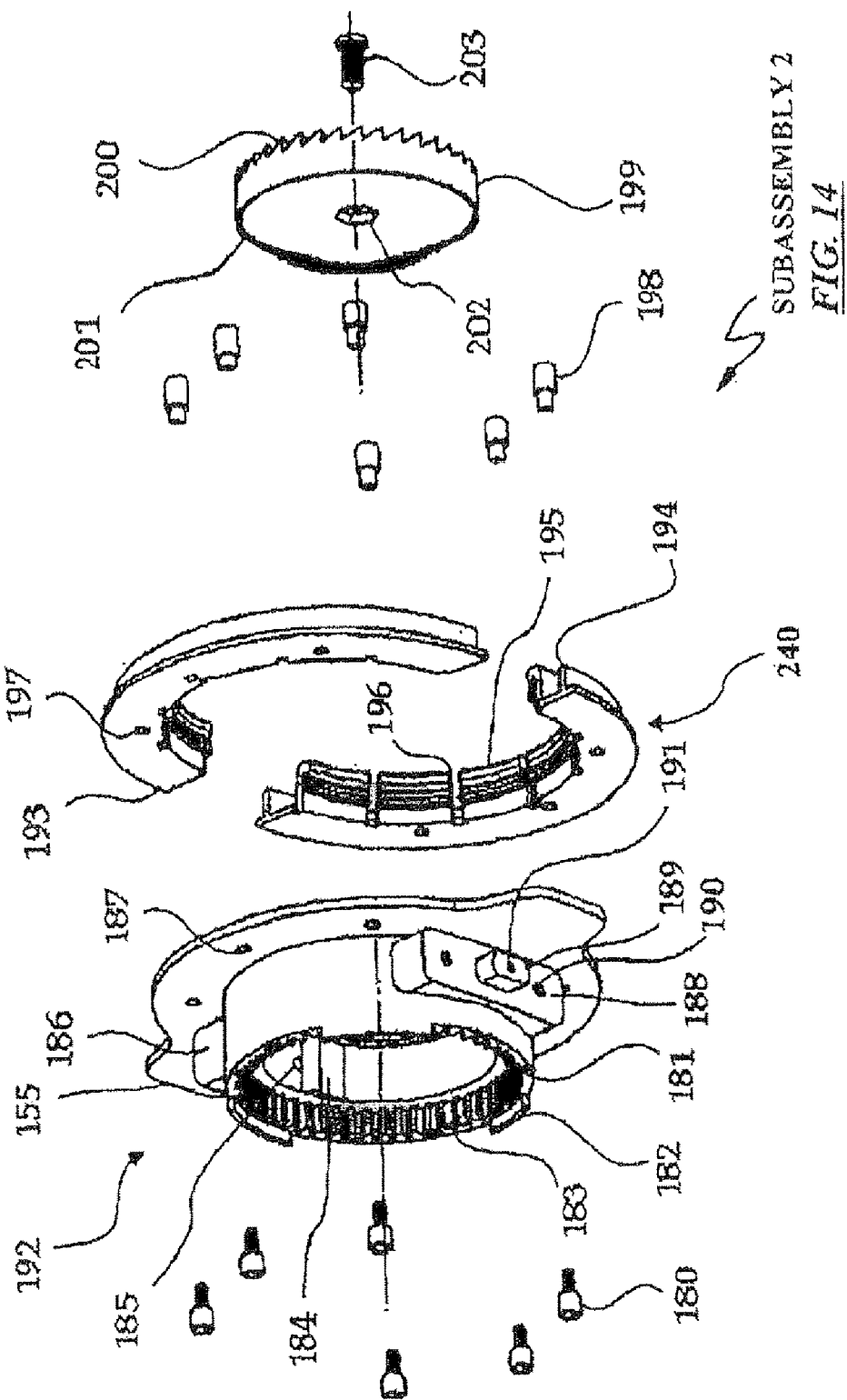
FIG. 14 SUBASSEMBLY 2

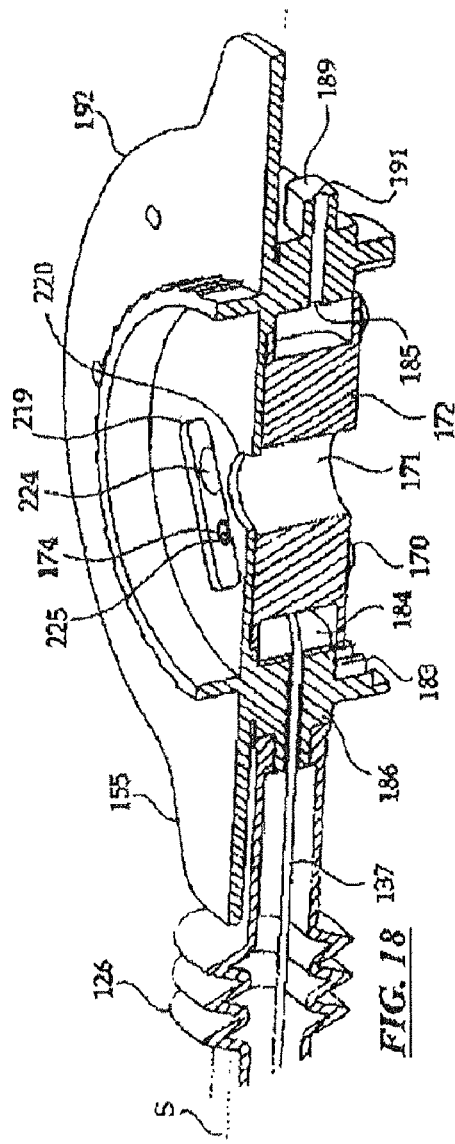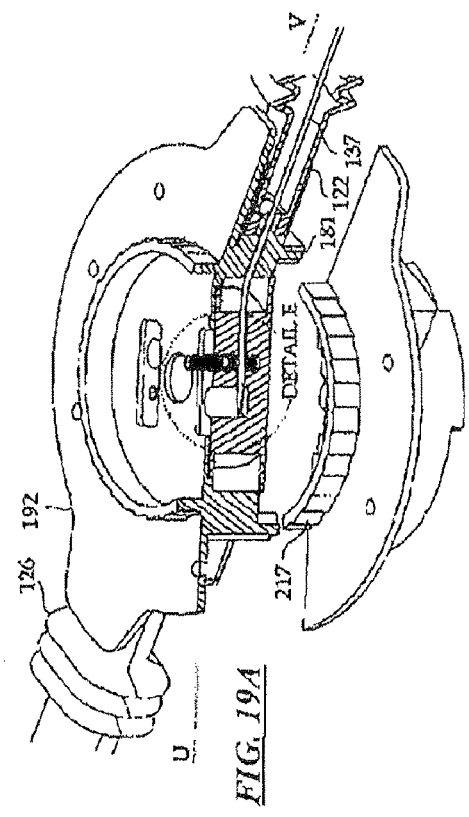

TIGHTENING MECHANISM FOR ANTI-SKID AND TRACTION ENHANCEMENT DEVICES

CROSS-REFERENCE TO RELATED APPLICATION

This application is a National Stage entry of International Application No. PCT/EP2006/068631, filed Nov. 17, 2006, the entire specification claims and drawings of which are incorporated herewith by reference.

TECHNICAL FIELD OF THE INVENTION

The present invention pertains to the field of anti-skid and tire traction devices, and more particularly to a novel, improved, and easily and quickly installable tire anti-skid and traction enhancement device for wheeled vehicles to be used on deformable or slippery ground conditions such as snow, new snow, packed snow, slush, ice, mud, soil, sand, grass, wet grass, gravel, pebble covered roads, partially cleared roads, unplowed roads, puddle, slick surfaces, or the like. More particularly, the present invention relates to an improved tightening device for use in anti-skid or traction enhancement devices. The tightening device which underlies the core of the present invention features clutching, mechanical advantage, ratcheting, integrity and sealing in a single body.

DESCRIPTION OF THE PRIOR ART

Under normal conditions, vehicles use all-weather tires or regular tires since the traction of the wheels is generally adequate. However; when the ground is deformable or slippery, vehicles need anti-skid and traction enhancement to prevent slipping or skidding during operation. Such enhancement is also required for better traction during operation, and for extricating the vehicle if it is stuck. Conventionally, said enhancement is provided by a number of solutions like snow tires (may be studded, or filled with abrasive particles like Silicon Carbide), tire chains and cables, strap-like traction devices, pneumatically driven chains, wheel sanders, traction pads, or various rigid and non-rigid devices well-known in the art. Under bad weather conditions, attachment of anti-skid and traction enhancement devices is generally required, for all vehicles with no exception, by legislation.

Tire chains and cables are not of the type "one-size fits all". Also, installation is complicated, risky, messy, physically difficult for many of the users (especially for physically incapable users), and may require assistance of a second individual. Their installation generally require laying a chain or cable on the ground and moving the vehicle on it or jacking up the vehicle, reaching behind the wheel by hand to fasten an inside ring or removal of the wheel and attachment of pre-installed parts, etc. Since these devices generally comprise a large number of metal chains, they are generally heavy and hence difficult to handle.

Moreover, since chains and cables are dimensionally instable and are difficult to tighten, tautness of the device is usually inadequate which may lead to slack occurrence and eccentricity around the tire during operation. So, tension must be reset after running the vehicle for a while so as to maintain tight fit. To take-up slack, resistive elastic tensioners are used in tightening the device. However; contradictorily, resistive tensioners require more physical power for installation. Also, like all metallic traction enhancement devices, chains and cables behave like heat sinks due to high heat transfer coefficient of metal material. These may numb user's hands.

As for some other rigid traction devices, they are usually mounted on the pre-installed parts—so called adapter plates—which are fixed to wheel hubs generally by custom manufactured nuts and bolts. This is an ordeal, because hub cap and wheel cover should be removed (if any) and there is no single hub configuration used on all wheels. Plus, because all parts of the device are rigid, it cannot be mounted to wheels with recessed or outwardly projected hubs (e.g. hubs of trucks, etc.) and is not universally adaptable to all wheel sizes and fender clearances. This rigidity may also cause buckling and smashing of the device due to tire dynamics and resultant damaging moment forces on the joints. The same rigidity also makes it impossible to snugly fit the device on the tire which results in slack occurrence.

While there have been a large number of devices and methods existing in the prior art, they do not teach or suggest a superior device that obviates aforementioned drawbacks Neither do they disclose a tightening mechanism which features clutching, mechanical advantage, ratcheting, integrity and sealing in a single body.

EP 0 835 770 discloses an anti-skid device which comprises a plurality of hooking elements coupled to a chain in a detachable manner. An advanced winding gear is also used for tensioning the chain and prohibiting reverse rotation of gears during installation. The tightening system incorporates a leaf spring which is loaded with the spring force as much as the gears are rotated. A major drawback of this structure is the fact that the extent of tensioning the system is limited with that of the leaf spring, which in the end makes the anti-skid device applicable to a limited range of tire dimensions. A second drawback is the fact that the user is required to spend effort in order to overcome the strength of the leaf spring. Obviously, this diminishes or at least reduces the mechanical advantage gained by the reduction gearset.

JP 60-255511 discloses an anti-skid device comprising rigid surface contact members and a semi-rigid tightening system. Two parts of the anti-skid device is forced towards each other by way of rotating a ratcheted gear operating on a rigid toothed bar that penetrates through the tightening system. Those skilled in the art can easily appreciate that the teeth and hence the tightening system is open to adverse outside conditions such as water, ice, dust etc. and hence is subject to failure e.g. when water freezes on the toothed bar or when solids like dust or mud accumulates on the vicinity of the tightening system.

JP-9-193631 discloses an improved tightening mechanism in which a spring loaded knob is pressed to disengage a ratchet and thereby winding a wire. When the user releases a knob, a ratchet engages and releasing of the tension is avoided. Obviously, the ratcheting function is very much vulnerable to malfunction due to the nature of its construction. Furthermore, there is no mechanical advantage (i.e. the user is forced to apply all required torque to tighten the wires himself). Another disadvantage of this construction is the necessity to use multiple winding apparatus around the periphery of the tire. Apparently, these cannot be tightened simultaneously with the obvious result that it is almost impossible to obtain an equally balanced tightening.

A similar tightening mechanism is disclosed in JP-6-127224 where a single tightening apparatus may suffice for tightening the entire anti-skid device. A major drawback of this mechanism appears to be the limitation of tensioning of the tensioning wire with the small volume of the reeling chamber inside which the tensioning wire can readily get stuck especially in the presence of unwanted materials such as mud, snow, ice etc. A further problem with this mechanism is the lack of integrity (i.e. the inner structure comprising the gear set of the device can readily fall outside the main casing and cause disengagement of the tensioning wires).

SUMMARY OF THE INVENTION

The present invention relates to a tire anti-skid and traction enhancement device adapted for mounting on the wheels of a vehicle. Particularly, the present invention discloses an improved tightening mechanism for use with such anti-skid devices.

By way of an example and not of limitation, the device comprises a flexible retaining ring (FIG. 2) positioned at the inner side of the wheel (FIG. 1B). Ends of said retaining ring are drawn towards each other and fastened onto each other using the fasteners shown in FIGS. 3A, 3B, 3C and 3D. Said retaining ring is intended to retain the ends of a plurality of surface contact members which transversely cover the tire along the periphery as shown e.g. in FIG. 9A. Said surface contact members are removably secured to the retaining ring from their distal ends by means of simple inner extensions (FIGS. 3E and 3F), and are preferably symmetrically distributed around the periphery of the tire. Said surface contact members are snugly fitted to the tire by means of the unique tightening system of the present invention. Tightening systems draw surface contact members towards each other or towards rotational axis of the wheel from their proximal ends in a way to ensure tautness of the surface contact members on the tire and closure of the whole device around the wheel. Without departing from the scope and spirit of the present invention, the tightening system (135) (FIGS. 9A, 9B, 11A, 11B) can also be employed in anti-skid and traction enhancement devices such as snow chains, cables, and non-metallic devices, etc. other than the surface contact members (63, 71) (FIGS. 9A, 11A) described herein.

The retaining ring is preferably made of flexible, durable, weathering resistant, and anti-corrosive polymers which may also have metal insert, and may be manufactured by injection molding, extrusion, etc. Surface contact members are preferably made of flexible, durable, and wear/tear/abrasion resistant polymers such as high performance Polyurethane elastomer enriched with abrasive particles (e.g. Silicon Carbide, etc.) and anti-slipping agents (e.g. Silica, etc.), and may be manufactured by injection molding.

The tightening mechanism of the present invention provides mechanical advantage by means of planetary gears, bevel gears, regular gear trains, worm gears, racks and pinions, power screws, ratchets and pawls, etc. The tightening system either draws the surface contact members obliquely towards each other or radially towards the central axis of the wheel simultaneously at the same rate.

The tightening mechanism which underlies the core of the present invention incorporates a knob which, when pressed, engages a clutch that transmits the rotational movement to wind the tensioning wires. Simultaneously, the ratchet teeth, which are engaged with the pawls avoids reverse rotation of the gears. The tightening mechanism is fully sealed from outside by a sealing device that prevents foreign materials like snow, dust, mud, ice etc. from entering into the mechanism, hence allowing the device to be operable under all adverse conditions expected at times the anti-skid or traction enhancement device shall be used. Another aspect of the present invention is the fact that the tightening mechanism helps keeping the integral structure of the anti-skid device. The resilient structure is designed to compensate against dynamic instabilities that occur during driving.

OBJECTS OF THE PRESENT INVENTION

An object of the present invention is to provide a tightening mechanism which comprises a clutch mechanism and a ratchet mechanism for tightening a plurality of surface contact members around a tire and which at the same time provides integrity to the anti-skid or traction enhancement device to compensate for dynamic instabilities that occur during driving.

A further object of the present invention is to provide a tightening mechanism which is sealed against water, ice, dust or other unwanted materials that could inadvertently affect functioning of the tightening mechanism.

Yet another object of the present invention is to provide a tightening mechanism which incorporates a mechanism that provides mechanical advantage in order to reduce the torque needed for installing and tightening the anti-skid device onto a wheel to enable simple use for relatively weak or physically incapable people.

Yet another object of the present invention is to provide a tightening mechanism which eliminates the necessity of time consuming or difficult-to-perform operations such as jacking the vehicle off the ground, moving the vehicle onto a laid anti-skid device, etc.

Still a further object of the present invention is to provide a tightening mechanism which makes an anti-skid or a traction enhancement device substantially non-rigid and self-tensioning in order to help absorbing damaging forces resulting from tire dynamics and surface conditions.

Still a further object of the present invention is to provide a tightening mechanism which remains snugly fit onto the tire without the need for resetting the tension to take-up slack during operation.

Still a further object of the present invention is to provide a tightening mechanism which helps to maintain a light weight anti-skid or traction enhancement device.

Still a further object of the present invention is to provide a tightening mechanism which is universally applicable to a wide variety of wheel configurations (including dual wheels), tire dimensions, wheel covers and hub caps.

Other further objects of the present invention will become apparent from accompanied drawings, brief descriptions of which follow in the next section as well as appended claims.

BRIEF DESCRIPTIONS OF THE DRAWINGS

In the following, the invention is described in more detail with reference to the drawings, which are given solely for the purpose of exemplifying the invention, in which:

FIGS. 1A and 1B show a wheel from outer and inner sides, respectively.

FIG. 2 shows a fastened retaining ring.

FIGS. 3A and 3B show, respectively, a fastener from top and bottom sides and detail A of FIG. 3A.

FIG. 3C shows fasteners of FIG. 3A and FIG. 3B in overlapped and secured positions.

FIG. 3D shows, respectively, cross-section (taken along A-A) and top view of the fasteners of FIG. 3C.

FIGS. 3E and 3F show assembled and exploded views of inner extensions.

FIG. 3G shows the installed device from the inner side of the wheel.

FIG. 5 shows cross section of connection assembly of FIG. 4 taken along plane S.

FIGS. 5A and 5B show the details of the connection assembly of FIG. 5 in unsecured and secured configurations, respectively.

FIGS. 6A, 6B and 6C show the details of fastening procedure of the tightening system of FIG. 4.

FIGS. 7A and 7B show the assembly and details of a tightening system according to an alternative embodiment of the present invention.

FIG. 8 show assembly details of the embodiment shown in FIG. 7A.

FIG. 9A shows the installed device using the tightening system of FIG. 4 from the outer side of the wheel.

FIG. 9B shows the installed device using the tightening system of FIG. 7A from the outer side of the wheel.

FIG. 10A shows connection details of an alternate embodiment.

FIG. 10B shows connection details of an alternate embodiment.

FIG. 11A shows assembled tightening system of the alternate embodiment shown in FIG. 10A.

FIG. 11B shows assembled tightening system of the alternate embodiment shown in FIG. 10B.

FIG. 12 shows the tightening mechanism used in tightening system of FIG. 4 in three subassemblies.

FIG. 13 shows exploded view of the first subassembly shown in FIG. 12.

FIG. 14 shows exploded view of the second subassembly shown in FIG. 12.

FIG. 18 shows a complete cross-section (taken along plane S) of the tightening mechanism of FIG. 4.

FIG. 19A shows revolved cross-section (taken along U-V) of simplified tightening system of FIG. 4.

FIG. 19B shows details of securing the connecting member of tightening system of FIG. 4 inside its tightening mechanism.

DETAILED DESCRIPTION OF THE INVENTION

Figure 4:
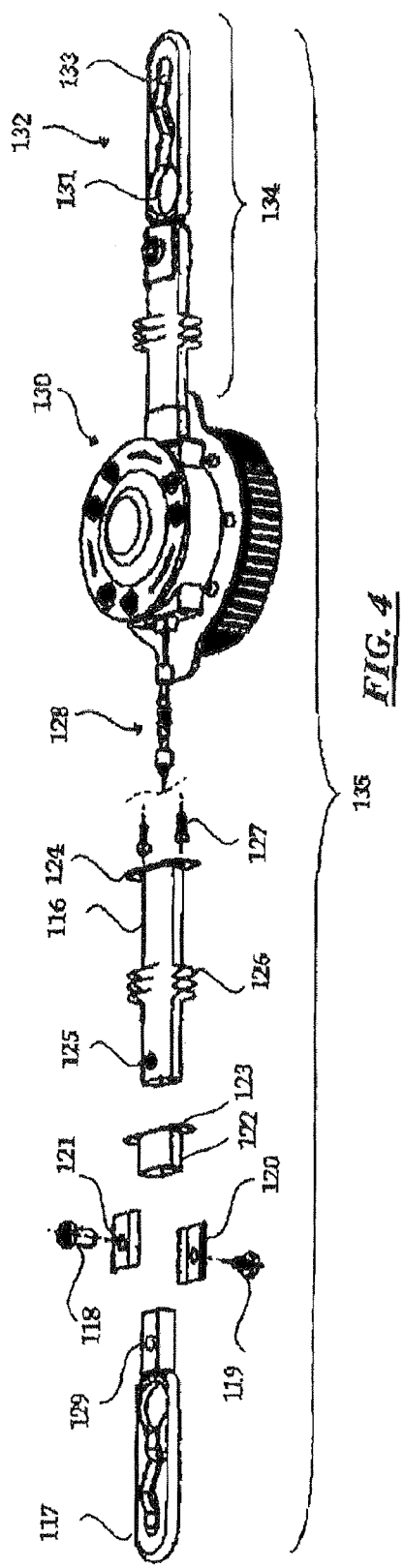
FIG. 4 shows partly exploded perspective view of a tightening system according to an embodiment of the present invention.

Hereinafter, preferred embodiments of the present invention will be described in detail with reference to the accompanying drawings.

A retaining ring (14) according to the present invention is shown in FIG. 2. The ring (14) comprises a plurality of retaining portions (15), two end portions (16), a plurality of nests (17) and a plurality of shoulders (18) acting as stoppers. Nests (17) are designated to host inner extensions (79) which connect surface contact members (63) to the retaining portions (15).

The perspective view of a fastener (19) is illustrated in FIG. 3A. On the tip of top face T, there is a boss-like securing element (21) which has a neck N and a head H as shown in Detail A. A plurality of adjustment apertures (20) are designated to host securing element (21) of an adjoining fastener (19). Obviously, as the number of adjustment apertures (20) increases, retaining ring (14) can be easily adjusted to fit a wide range of wheel sizes.

The anti-skid device of the present invention comprises a plurality of surface contact members (63) which are made of substantially flexible and sufficiently elastic high-performance polymers such as Polyurethane elastomers. The material may be enriched with anti-skid agents such as Silica and abrasive particles such as Silicon Carbide or Aluminum Oxide.

FIG. 4 shows an alternative slim tightening system (135) which has mechanical advantage over previously mentioned tightening systems, and comprises a tightening mechanism (130), two resilient connecting members (128), two expandable sleeves (116), and two attachment means (117). Connection assembly (134) is shown on one side of the tightening mechanism (130), and on the other side, exploded view of connection assembly (134) is illustrated. During assembling, one end of the connecting member (128) is secured into tightening mechanism (130) where the base (124) of sleeve (116) is reclined on the tightening mechanism (130) and the sleeve (116) is sandwiched between base (123) of sleeve support (122) and tightening mechanism (130) by screws (127) through holes (136) and (190) (FIGS. 5 and 14, respectively) all the way inside tightening mechanism (130). Also, sleeve (116), washers (120), opposite end of connecting member (128), and attachment means (117) are aligned and put together by fasteners (118) and (119) through holes (121, 125, and 129). Attachment means (117), washers (120), and sleeve supports (122) may be made of high impact polymers such as Reinforced Polyamide 66 or the like, whereas sleeves (116) may be made of elastic materials such as EPDM. Sleeves (116) also completely protect the connecting members (128) from external environment, and elongates or contracts during tightening and releasing the device preferably by means of bellows (126).

FIG. 5 illustrates sectioning of connection assembly (134) by plane S. FIG. 5A shows that wire (137) passes through the sleeve (116), enters attachment means (117) and extends all the way into fastener (118) from aperture (139). Then, as shown in FIG. 5B, fastener (119) is driven into fastener (118) jamming—therefore securing—the wire (137) between the base (141) of fastener (118) and tip (140) of fastener (119). Connecting member (128) is basically comprised of a coil spring (143) and two stranded steel wires (137) (which may be coated with low-friction materials like Nylon, PTFE, or Teflon in order to reduce friction during tightening and releasing) tips (138) of which are welded to prevent separation of strands from one another. Coil spring (143) behaves like a tensioner to take-up any slack during installation and operation, to continually apply closure force to the whole device, and also to neutralize the instabilities and deformations which may occur due to dynamic interactions between ground and tire (4). Instead of a coil spring (143), other resilient tensioners (e.g. rubber cords, etc.) can be used. Each wire (137), having a stopper (144), passes through retainer (142) and the coil spring (143), and secured back into the retainer (142) by means of set screws (145).

FIGS. 6A through 6C show how to fasten and secure attachment means (117) to the surface contact member (63) from its proximal end (47). First, attachment means (117) is engaged with the boss member (146) from its wide aperture (131) (FIG. 4) at position P3. Attachment means (117) is then pulled in direction D10 passing the zigzag pattern (132) (FIG. 4), and engages with narrow aperture (133) (FIG. 4) at position P4. Because narrow aperture (133) is slightly wider than neck (147) but substantially narrower than boss member (146), attachment means (117) cannot escape by mistake when boss member (146) is at position P4. By pushing attachment means (117) in direction D11 and pulling apart from proximal end (47), tightening system (135) is disengaged from proximal end (47). Zigzag pattern (132) prevents displacement of boss member (146) from position P4 to position P3 during operation. FIG. 9A illustrates a complete assembly using tightening system (135) on the wheel (1) from the outer side (2).

FIGS. 7A, 7B, 8 and 9B show details of a tightening system (135) (FIG. 9B) where the tightening mechanism (130) is mounted on extending adapter portion (67) of surface contact member (63). Said adapter portion (67) necessarily exists on proximal end (47) of surface contact member (63 or 71) only when tightening mechanism (130) itself is located on proximal end (47) as shown in FIG. 9B. Tightening mechanism (130) has a projection (152)—which sits on cavity (68)—and a plurality of nut extensions (150) which sit on recesses (69) and pass through holes (70) to be secured to adapter portion (67) by screws (83). Tightening system (135) has one connection assembly (134) with a longer sleeve (116).

Tightening system shown in FIG. 10A has a tightening mechanism (130) which has a plurality of connection assemblies (134) (FIG. 4), the number of which depends on the number of surface contact members (71) used in the device. Embodiment shown in FIG. 10B comprises a plurality of tightening systems (135) (FIG. 9B) which are connected to boss members (146) on a terminal node (156) from their attachment means (117). Number of boss members (146) and tightening systems (135) depend on the number of surface contact members (71) used in the device. Embodiments shown in FIGS. 10A and 10B tighten surface contact members (71) towards the central axis of the wheel (1) as shown in FIGS. 11A and 11B, respectively.

Figure 15:
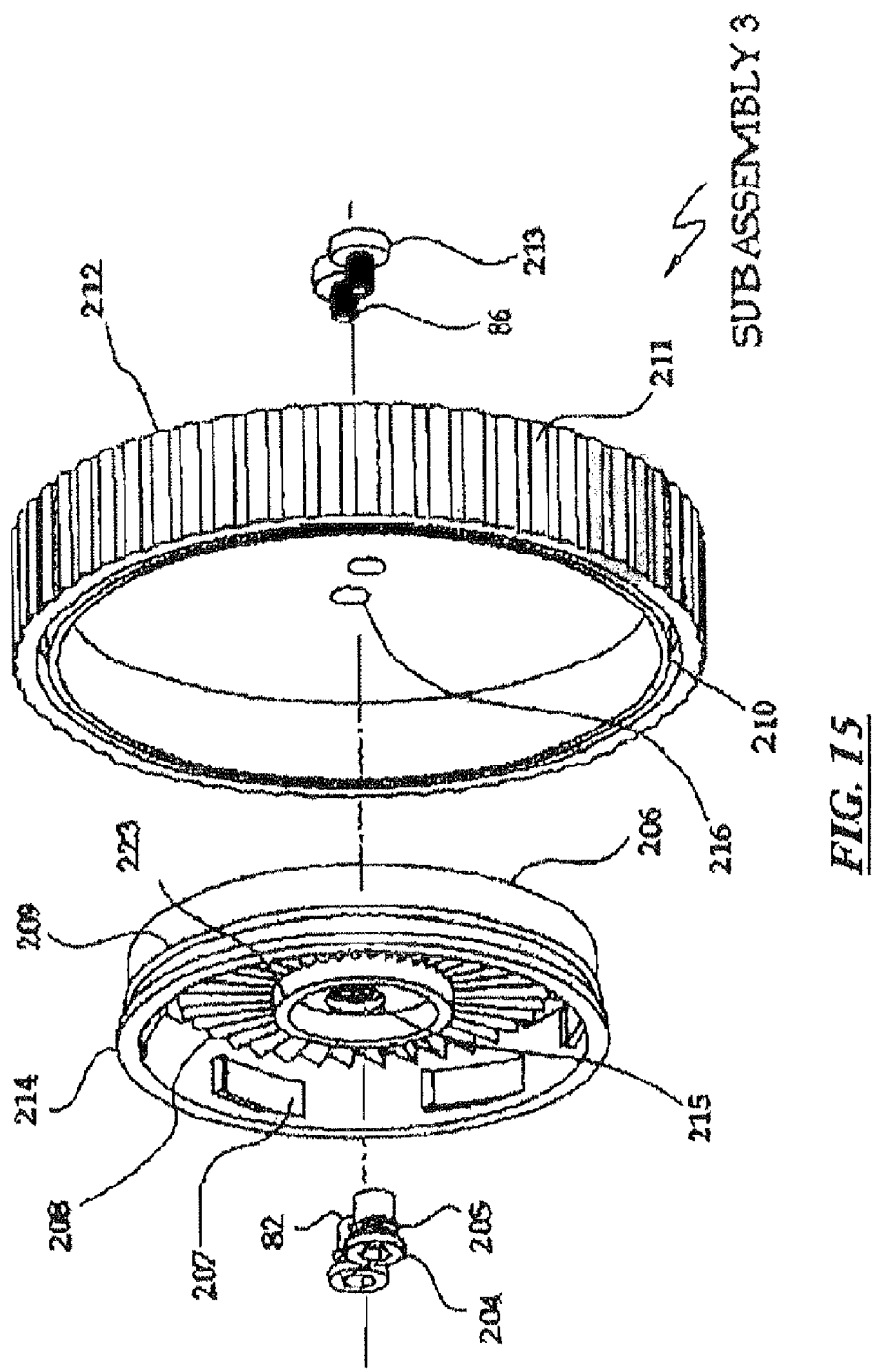
FIG. 15 shows exploded view of the third subassembly shown in FIG. 12.

FIG. 12 illustrates three subassemblies which constitute the tightening mechanism (130). Materials used in tightening mechanism (130) are preferably made of light weight and high strength materials. Equally, moving parts shall have low friction coefficients and be wear resistant. FIGS. 13, 14 and 15 show exploded views of Subassemblies 1, 2 and 3, respectively. In Subassembly 1 of FIG. 13, cylindrical sleeve (177)—having a narrow cylindrical tip (178) and hexagonal inner bore (179)—surrounds and journals hexagonal rod (175) inside reel (172). Length of cylindrical sleeve (177)—excluding tip (178)—is equal to the length of bore (171) of reel (172). Rod (175) has two inner threaded portions (176) at its tips. Rod (175) is longer than sleeve (177) and unequally extends from the ends of sleeve (177) when surrounded by it. Planet gears (168) settle on cylindrical extensions (169) of reel (172). Planet gears (168), together with sun gear (167) and ring gear (183) (see Subassembly 2 of FIG. 14), constitute a planetary gear system. Instead of planetary gear system, other gearsets like a wormset may be employed. It may also be self-locking or employ a ratchet and pawl system. Tips (170) of extensions (169) extend from inside planet gears (168) and pass through holes (166) of support plate (165), and terminate in the recesses (not shown) at the top face of cipher plate (162). Then, rod (175) and sleeve (177) together pass through bore (171) of reel (172), and lower tip of rod (175) extends from sleeve (177) and sits inside hexagonal bore of sun gear (167). Then, screw (164) is driven into inner threaded portion (176) of the lower tip of rod (175) stacking the cipher plate (162), support plate (165), sun gear (167) and planet gears (168), and reel (172) together. Then, bottom plate (161) is fastened to bottom face of cipher plate (162) by driving screws (157) through threaded bores (158, 159). Said screws (157) extend from top face of cipher plate (162) and penetrates into threaded slots (181) of the casing (192) (FIG. 14). Reel (172) has one or a plurality of passageways (173)—number of which depends on the number of connection assemblies (134) used in the device—through which a wire (137) is passed and jammed inside the thickness of reel (172) by means of set screw(s) (174). When rod (175) is rotated, wire(s) (137) is/are wound around reel (172) in a way to tighten the anti-skid device. Projection (152) has a cavity inside (FIG. 20) so that screw (164) can freely rotate (together with rod 175) around its unthreaded portion. Furthermore, cipher plate (162) has a plurality of cipher cavities (163) of same or different widths that engage with the cipher projections (182) of casing (192) when casing (192) encapsulates Subassembly 1 of FIG. 13. There may be some cipher markings (160) on bottom plate (161) for error-proofing—so as to align threaded bores (158, 159)—while fastening bottom plate (161) to cipher plate (162).

Figure 20:
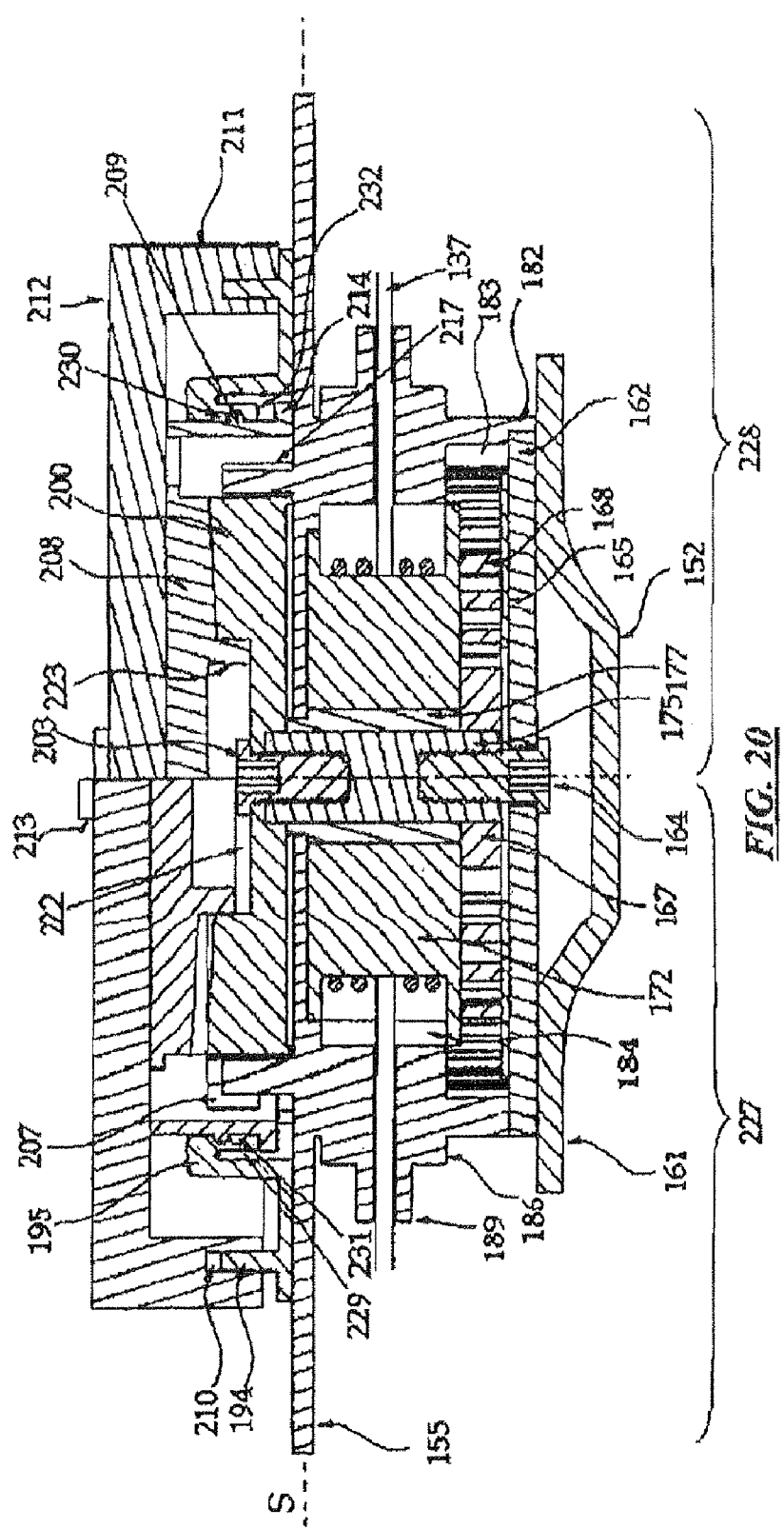
FIG. 20 shows a complete cross-section (taken along plane S) of the tightening mechanism of FIG. 4 showing locked and unlocked configurations.

Casing (192) encapsulates Subassembly 1 in a way that planet gears (168) make a gear mesh with ring gear (183) to form a planetary gearset. Sleeve (116) and sleeve support (122) settles onto base (188) of sleeve extension (186) (number of which depends on the number of connection assemblies (134) used in the system) on casing (192), encapsulating the wire extension (189). Wire (137) enters from hole (191), passes through the thickness of casing (192), and exits from hole (185), and then enters the reel (172) by leaning on the bending wall (184). Casing (192) may also have a plurality of wings (155) so that the user can press against the tightening mechanism (130) with one hand while tightening the system with the other hand. Subassembly 2 has a lock component (193) in two halves which are mounted on the casing (192) by driving screws (180) into nuts (198) which pass through bores (187, 197). Lock component (193) has an outer sidewall (194) around its periphery which acts as a sealing device that prevents slush, water, sand, mud or dust entry into the tightening mechanism (130) when coupled with sealing slot (210) of knob (212) (Subassembly 3). Otherwise, slush or water would freeze inside the mechanism (130) and clog the moving parts which would make the device inoperative. Lock component (193) has an inner sidewall (195) which is preferably constructed in the form of a plurality of recessed portions (195)—separated from each other by gaps (196)—on its periphery. Each recessed portion (195) is U-shaped with a gap (229) (FIG. 20). Gaps (196) and (229) provide flexing of lock component (193) during locking and unlocking the tightening mechanism (130).

As illustrated in FIG. 14, the tightening mechanism (130) comprises in between the reel (172) and the upper clutch (206) (FIG. 15), a locking component (193) which has a base plate (240), an inner sidewall (195) and an outer sidewall (194). Both of the sidewalls (194, 195) stand perpendicular to said base plate (240). As shown in FIG. 20, the inner sidewall (195) has a plurality of recesses (230, 231) which are adapted to engage with a peripheral projection (209) of the upper clutch (206) for holding the knob in place during locked and unlocked positions of the knob (212). The knob (212) is in the unlocked position (227) when the knob (212) is not pressed and in the locked position (228) when the knob (212) is pressed. As outlined above, the outer sidewall (194) enters partly or fully, respectively in unlocked and locked positions of the knob, into a corresponding slot (210) of said knob (212) for sealing inner volume of the tightening mechanism (130) from outside conditions.

Figure 17:
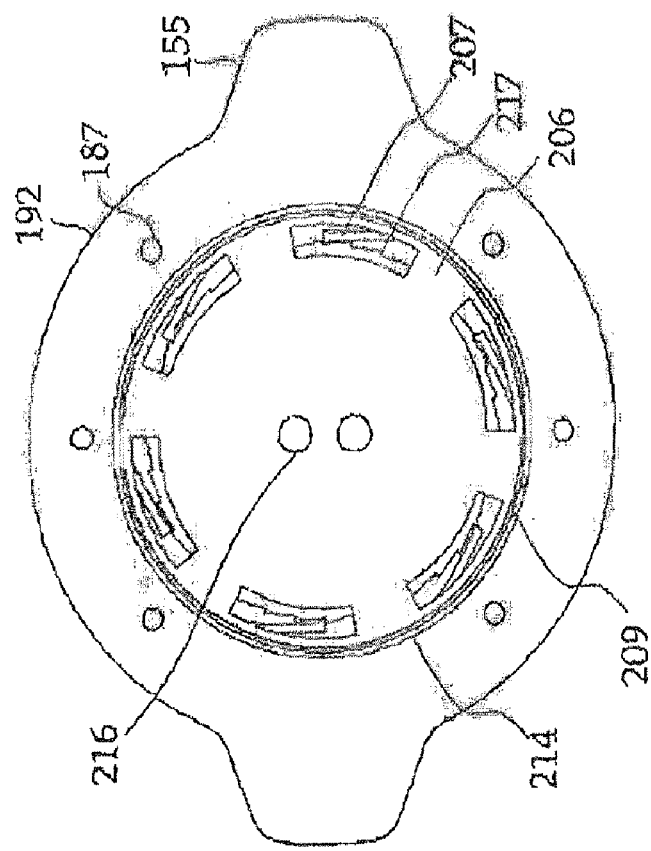
FIG. 17 shows simplified top view of ratchet and pawl engagement used in the tightening mechanism of FIG. 4.
Figure 16:
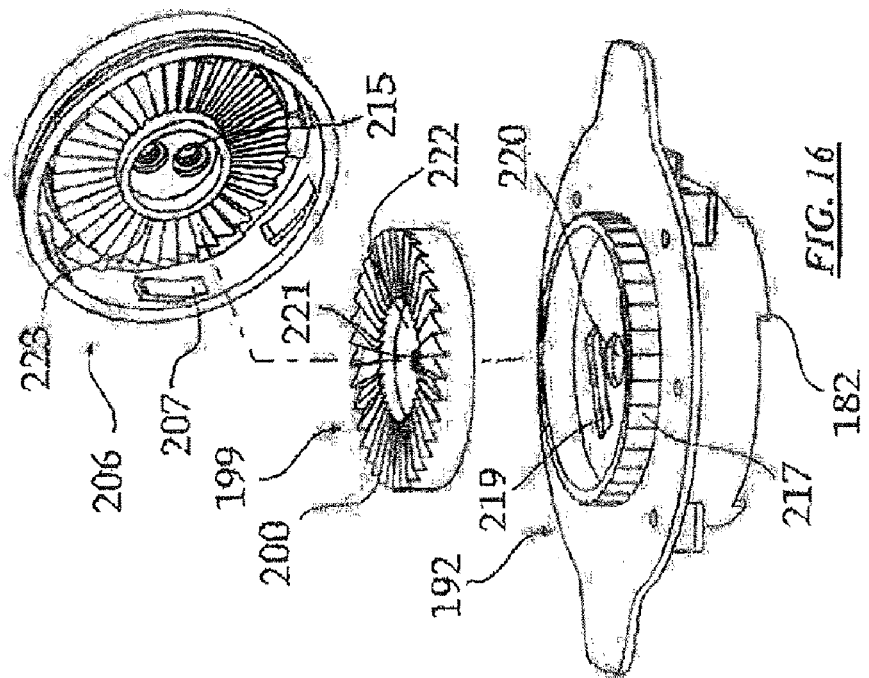
FIG. 16 shows simplified exploded view of the clutch mechanism used in the tightening mechanism of FIG. 4 together with ratchets and pawls.

Lower clutch (199) has ratchet teeth (200) on the top and sits on top of casing (192) (as shown in FIG. 16). Thin edge (201) reduces friction during rotation. Rod (175) terminates at the base of hexagonal recess (202) and secured to lower clutch (199) by driving the screw (203) through threaded bore (221) (FIG. 16) of lower clutch (199) from the top side, and then through inner threaded portion (176) of rod (175). In Subassembly 3 (see FIG. 15) there is an upper clutch (206) having a peripheral projection (209) (to be engaged with recesses 230 and 231), a peripheral foot (214), clutch teeth (208), a clutch guide (223), pawls (207), and two threaded bores (215). Foot (214)—when tightening mechanism (130) is in the unlocked position (227) (FIG. 20)—touches the bottom faces (232) (FIG. 20) of recessed portions (195), and prevents upper clutch (206)—and hence the knob (212)—from being disengaged from the system. By rotating the knob (212) in the locked position (228) where projection (209) couples with recess (231) (FIG. 20), clutch teeth (208) and (200) engage so that clutches (206, 199), rod (175), and the sun gear (167) rotate together. Rotating the sun gear (167) also rotates planet gears (168) around stationary ring gear (183). Therefore, the reel (172) (which behaves like the moving carrier of the planetary gearset) rotates together with planet gears (168) in a way to wind the wire (137). On the contrary, in unlocked position (227) where projection (209) couples with recess (230) (FIG. 20), clutch teeth (208) and (200) disengage from each other, lower clutch (199) and the reel (172) freely rotate with the tension inherent in the wound wire (137) in a way to release tightening system (135). Clutch guide (223) telescopes in guide recess (222) (FIG. 16) during locking and unlocking the tightening mechanism (130). Pawls (207) are always engaged with peripheral ratchet teeth (217) (FIGS. 16, 17) making the knob (212) and upper clutch (206) rotate in clockwise direction only. Despite lower clutch (199) tries to rotate the upper clutch (206) in releasing direction due to tension inherent in the wound wire (137), this self-locking attribute prevents wire (137) from being unwound in the locked position (228) even if the user stops rotating the knob (212). Lower clutch (199) freely rotates in releasing direction to unwind the wire (137) only when user pulls the knob (212) disengaging upper clutch (206) from lower clutch (199) as shown in unlocked position (227) (FIG. 20). Upper clutch (206) and knob (212) are assembled together by fastening the nuts (204) (which have also outer threads (205) to engage with the threaded bores 215) and screws (213) through holes (216).

FIG. 18 shows sectioning of a simplified tightening mechanism (130) by plane S. Wire (137) enters casing (192) by passing through holes (191) (of wire extension 189) and hole (185), and terminates inside the reel (172). Wire (137) is jammed and secured in reel (172) (shown in FIG. 19B). While tightening, wire (137) is wound around reel (172) and leans on the bending wall (184) which prevents the wire (137) from kinking and protects the edge of hole (185) from being worn out. Additionally, the bending wall (184) creates additional tension on wire (137) by bending the wire (137).

FIG. 19A illustrates a revolved sectioning of a simplified tightening mechanism (130) in the direction U-V to reveal the method of securing the wire (137) inside the reel (172). FIG. 19B further clarifies how wire (137) is secured by jamming inside reel (172). FIG. 20 illustrates the sectioning of a complete tightening mechanism (130) by plane S, in its unlocked position (227) and locked position (228). During locking and unlocking, outer sidewall (194) always stays inside sealing slot (210). Also, clutch teeth (200) are declined towards the center whereas clutch teeth (208) are inclined towards the center providing easier clutching.

The invention claimed is:

1. A tightening system (135) for use with anti-skid and traction enhancement devices for wheeled vehicles, the tightening system (135) comprising;
    at least one connection assembly (134) adapted to be pivotably and releasably attached to a proximal end of a surface contact member (63, 71) by way of an attachment means (117) at a first end of the at least one connection assembly (134) and which is adapted to connect to a tightening mechanism (130) at a second end of the at least one connection assembly (134),
    at least one tightening mechanism (130) which comprises a manually rotatable reel (172) for receiving one or more tensioning wires (137), a power transmitting gearset (167, 168) which rotates said reel (172), a lower clutch (199) and an upper clutch (206) for transmitting to said gearset rotational movement received from a knob (212) fixedly attached on top and around the periphery of said upper clutch (206), and
    a locking component (193) provided between the reel (172) and the upper clutch (206), the locking component (193) which keeps the upper clutch (206) and the lower clutch (199) engaged with each other, said locking component (193) having a base plate (240), an inner sidewall (195) and an outer sidewall (194), both sidewalls standing perpendicular to said base plate (240), where the inner sidewall (195) has a plurality of recesses (230, 231) which are adapted to engage with a peripheral projection (209) of the upper clutch (206) for holding the knob (212) in place during unlocked and locked positions (227, 228) of the knob (212) and where the outer sidewall (194) enters partly or fully, respectively in unlocked and locked positions of the knob, into a corresponding sealing slot (210) of said knob (212) for sealing inner volume of the tightening mechanism (130) from outside conditions.

2. The tightening system (135) as set forth in claim 1, wherein said inner sidewall is cut into a plurality of portions to provide gaps (196) around the periphery to provide flexibility for engagement of the peripheral projection (209) into the corresponding recesses (230, 231).

3. The tightening system (135) as set forth in claim 1, wherein the tip of said inner sidewall is substantially U-shaped having a gap (229) that provides flexibility for engagement of said peripheral projection (209) into said corresponding recesses (230, 231).

4. The tightening system (135) as set forth in claim 1, wherein the upper clutch (206) comprises a peripheral foot (214) which extends perpendicular to and outside an outer wall around the periphery and which abuts the bottom face (232) of the locking component (193) to prevent the upper clutch (206) and the knob (212) from being disengaged from the tightening mechanism (130) and maintain integrity.

5. The tightening system (135) as set forth in claim 1, wherein the connection assembly (134) comprises a plurality of connecting members (128) having one or more tensioning wires (137) attached to one or more resilient tensioners (143) which elongate to allow further tensioning of said tensioning wires (137) during tightening and which compress to compensate for vibratory forces that occur during driving.

6. The tightening system (135) as set forth in claim 5, wherein said resilient tensioner (143) is selected as a coil spring having two hooked ends, one end of which is attached to an attachment means (117) and the other end of which is attached to the tightening mechanism (130) to act as a tensioner to take up slack during operation.

7. The tightening system (135) as set forth in claim 5, wherein said attachment means (117) comprises a wide circular perforation (131) and a perforation with zigzag pattern (133) extending from said circular perforation.

8. A tire anti-skid and traction enhancement device comprising the tightening system (135) of claim 5, wherein the device comprises one tightening mechanism (130) and two connection assemblies (134) per each connection of surface contact members (63) around which each connection assembly (134) is releasably and pivotably attached to one proximal end of one of two adjacent surface contact members (63) whereby said tightening system obliquely draws two adjacent surface contact members (63) towards each other.

9. A tire anti-skid and traction enhancement device comprising the tightening system (135) of claim 5, wherein the device comprises one tightening mechanism (130) located in the central axis of the wheel and a plurality of connection assemblies (134) which extend radially around the tightening mechanism (130) and which are releasably and pivotably attached to proximal ends of the surface contact members (71) wherein said tightening system (135) radially and equally draws surface contact members (71) towards the rotational axis of the wheel.

10. A tire anti-skid and traction enhancement device comprising the tightening system (135) of claim 5, wherein the device comprises, for each of the plurality of surface contact member (63) in the device, one tightening mechanism (130) which is mounted on an adapter portion (67) of surface contact member (63) and one connection assembly (134) which is releasably and pivotably attached to a proximal end (47) of a surface contact member (63) whereby said tightening system (135) obliquely draws two adjacent surface contact members for tightening.

11. A tire anti-skid and traction enhancement device comprising the tightening system (135) of claim 5, wherein the device comprises one tightening mechanism (130) attached on the proximal end (47) of each of a plurality of surface contact members (71) and one connection assembly (134) extending from said tightening mechanism (130) radially towards a terminal node (156) located on the center of the wheel and releasably and pivotably attached to said terminal node (156), whereby each tightening mechanism (130) acts radially towards rotational axis of the wheel and equally on each of the surface contact members (71).

12. A tire anti-skid and traction enhancement device comprising the tightening system (135) of claim 5, wherein the device comprises a retaining ring (14) whose plurality of retaining portions (15) comprise a plurality of nests (17) and shoulders (18), said nests host said inner extensions (79) whereby said shoulders prevent said inner extensions from dislocating along said flexible retaining ring.

13. A tire anti-skid and traction enhancement device comprising the tightening system (135) of claim 5, wherein the device comprises a retaining ring (14) which is preformed in an arcuate or circular form and which becomes a closed circle when said end portions (16) are joined by means of said fasteners (19).

14. A tire anti-skid and traction enhancement device comprising the tightening system (135) of claim 5, wherein the device comprises a retaining ring (14) at one end of which a fastener (19) incorporating a number of boss-like securing elements (21) are disposed and at the other end of which a plurality of adjustment apertures (20) are disposed.

15. An anti-skid and traction enhancement device comprising one or more of the tightening system (135) of claim 5.

16. The tightening system (135) as set forth in claim 1, wherein the connection assembly (134) comprises an expandable and compressible sleeve (116) encapsulating and isolating the connecting member (128) to protect said connecting member (128) from outside conditions.

17. The tightening system (135) as set forth in claim 1, wherein said knob (212) is selectively engagable with said gearset through said lower and upper clutches (199, 206) via said lock component (193) where said knob (212) is rotated wherein said lock component (193) becomes locked engaging said upper clutch (206) with said lower clutch (199) to transmit rotation of said knob to said gearset and thereby to said rotatable reel (172) allowing said wire(s) (137) to be wound around said rotatable reel by the rotation of said knob whereby said knob is rotated in an opposite direction wherein said lock component (193) becomes unlocked disengaging said clutches (199, 206) from each other to free said gearset and wherein said rotatable reel allows said wire(s) to be unwound by the wire(s) (137).

18. The tightening system (135) as set forth in claim 1, wherein said gearset (167, 168) and said reel (172) are rotatable only in the direction of tightening and tensioning said connecting member(s) (128) when said upper clutch (206) and lower clutch (199) are engaged with each other in the said locked position of said lock component (193).

19. The tightening system (135) as set forth in claim 1, wherein said upper clutch (206) comprises a pawl (207) which prevents said knob (212) from rotating opposite to the direction of tensioning.

20. An anti-skid and traction enhancement device comprising one or more of the tightening system (135) of claim 1.

* * * * *